United States Patent
Sakurai (10) Patent No.: US 10,114,695 B2
(45) Date of Patent: Oct. 30, 2018

(54) INFORMATION PROCESSING DEVICE, SEMICONDUCTOR DEVICE, AND MEMORY INSPECTION METHOD

(71) Applicant: FUJITSU LIMITED, Kawasaki-shi, Kanagawa (JP)

(72) Inventor: Yasutomo Sakurai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 82 days.

(21) Appl. No.: 15/412,095

(22) Filed: Jan. 23, 2017

(65) Prior Publication Data
US 2017/0242750 A1    Aug. 24, 2017

(30) Foreign Application Priority Data

Feb. 23, 2016    (JP) .................................. 2016-032180

(51) Int. Cl.
| | | |
|---|---|---|
| G11C 29/00 | (2006.01) | |
| G06F 11/10 | (2006.01) | |
| G06F 3/06 | (2006.01) | |

(52) U.S. Cl.
CPC ........ *G06F 11/1072* (2013.01); *G06F 3/0619* (2013.01); *G06F 3/0644* (2013.01); *G06F 3/0673* (2013.01)

(58) Field of Classification Search
CPC .... G06F 3/0619; G06F 3/0644; G06F 3/0673; G06F 11/1072; G06F 11/1666; G06F 11/1048; G06F 11/20; G06F 3/0652; G11C 29/4401; G11C 2029/0411; G11C 11/40611; G11C 11/40618; G11C 11/40622; G11C 29/52; H03M 13/05
See application file for complete search history.

(56) References Cited

U.S. PATENT DOCUMENTS

| | | |
|---|---|---|
| 2004/0221220 A1 | 11/2004 | Roth et al. |
| 2014/0164833 A1 | 6/2014 | Kobla et al. |
| 2015/0199246 A1 | 7/2015 | Miyazaki et al. |

FOREIGN PATENT DOCUMENTS

| | | |
|---|---|---|
| JP | 2004-334845 | 11/2004 |
| JP | 2015-515061 | 5/2015 |
| JP | 2015-135577 | 7/2015 |

*Primary Examiner* — Guerrier Merant
(74) *Attorney, Agent, or Firm* — Fujitsu Patent Center (57) ABSTRACT

An information processing device includes: a processor that executes processing of data; and a memory module that includes a first memory in which a plurality of memory chips each storing the data are mounted in layers, and a memory controller that controls the first memory, wherein the memory controller: inspects the data; executes correction processing of the data when a single bit error is detected; determines, when a single bit error is detected in a memory chip corresponding to a first layer, a first inspection area in a memory chip corresponding to another layer, based on a first location at which the single bit error occurs; and executes first inspection of data in the first inspection area.

20 Claims, 9 Drawing Sheets

INFORMATION PROCESSING DEVICE, SEMICONDUCTOR DEVICE, AND MEMORY INSPECTION METHOD

CROSS-REFERENCE TO RELATED APPLICATION

This application is based upon and claims the benefit of priority of the prior Japanese Patent Application No. 2016-032180, filed on Feb. 23, 2016, the entire contents of which are incorporated herein by reference.

FIELD

The embodiments discussed herein are related to an information processing device, a semiconductor device, and a memory inspection method.

BACKGROUND

In a cell of a random access memory (RAM) such as a dynamic random access memory (DRAM), bit inversion occurs due to the influence from a neutron beam or the like.

A technology in the related art are disclosed in Japanese Laid-open Patent Publication No. 2004-334845, Japanese National Publication of International Patent Application No. 2015-515061, or Japanese Laid-open Patent Publication No. 2015-135577.

SUMMARY

According to an aspect of the embodiments, an information processing device includes: a processor that executes processing of data; and a memory module that includes a first memory in which a plurality of memory chips each storing the data are mounted in layers, and a memory controller that controls the first memory, wherein the memory controller: inspects the data; executes correction processing of the data when a single bit error is detected; determines, when a single bit error is detected in a memory chip corresponding to a first layer, a first inspection area in a memory chip corresponding to another layer, based on a first location at which the single bit error occurs; and executes first inspection of data in the first inspection area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a memory including plural RAM cells, for example, when a single bit error state in which one bit out of plural bits constituting data has underwent a bit inversion is left as it is, it may make still other bit to be inverted causing a multibit error state. Therefore, a patrol operation in which diagnostic access is made to all RAM cells in the memory in a certain amount of time is performed, in order to detect and correct the single bit error in an early timing. Note that a three-dimensional memory in which memories are layered may be used.

In a semiconductor device in which memory chips that include RAM cells are mounted in multiple layers (mounted three-dimensionally), bit inversions due to the influence from neutron beams and the like may occur simultaneously in plural memory chips. When the error that has occurred is a single bit error, it is detected and corrected by an error checking and correcting (ECC) function and the like. However, the single bit error may be detected and corrected at an early timing, because the single bit error may progress to a multi-bit error causing a system failure before the single bit error is detected and corrected. For example, in a semiconductor device in which memory chips are mounted three-dimensionally, when bit inversions occurred simultaneously in plural memory chips, it may take time before all single bit errors in plural memory chips are detected by the patrol operation. For example, single bit errors that have occurred simultaneously in the plural memory chips in the semiconductor device in which memory chips are mounted in multiple layers may be detected at an early timing.

Figure 1:
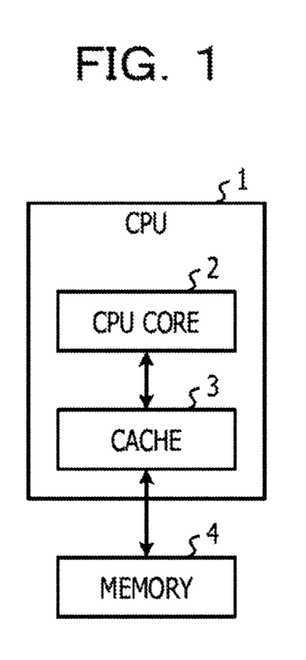
FIG. 1 illustrates an example of an information processing device.

FIG. 1 illustrates an example of an information processing device. The information processing device includes a central processing unit (CPU) 1 and a memory (main memory) 4. The processing unit 1 reads data from the memory 4 applying processing and writes data obtained as the processing result to the memory 4. The processing unit 1 includes a CPU core 2 that executes processing according to an instruction and a cache unit 3 that holds data of the memory 4. The memory 4 stores data and the like related to the processing in the processing unit 1.

Figure 2:
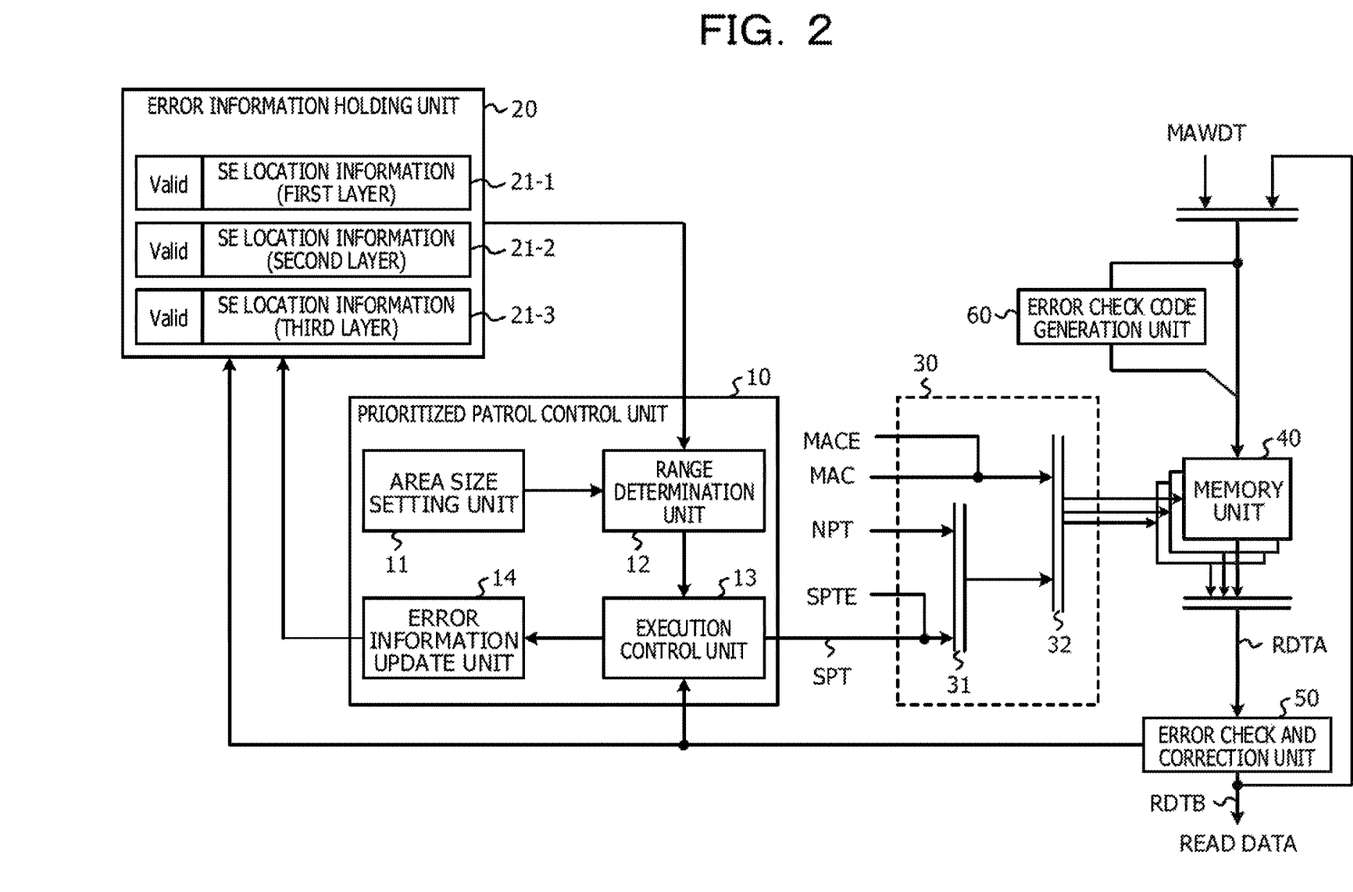
FIG. 2 illustrates an example of a memory.

FIG. 2 illustrates an example of a memory. The memory 4 includes plural memory chips, and the memory chips are mounted in multiple layers (mounted three-dimensionally). For example, three memory chips are mounted with each layer being referred to as the first layer, the second layer, and the third layer in the order from the top. The memory 4 includes a prioritized patrol control unit 10, an error information holding unit 20, an access control unit 30, a memory unit 40, an error check and correction unit 50, and an error check code generation unit 60.

In the error information holding unit 20, error information on single bit errors detected in the memory chips included in the memory 4 is stored. The error information holding unit 20 includes areas that respectively hold error information 21-1 of the first layer, for example, the memory chip disposed on the uppermost side, error information 21-2 of the second layer, for example, the memory chip disposed in the middle, and error information 21-3 of the third layer, for example, the memory chip disposed on the lowermost side.

The error information includes a valid flag (Valid) and single bit error location information (SE location information). The valid flag (Valid) indicates whether or not a single bit error has been detected. When a single bit error has been detected in a read access or normal patrol operation, a valid flag corresponding to the memory chip in which the single bit error has been detected is set up. The single bit error location information (SE location information) indicates the location at which the single bit error has occurred. Information indicating the location of the RAM cell (memory cell) at which the single bit error has been detected is held as the single bit error location information.

The location information of the error information indicates the physical location of the RAM cell in the memory chip, unlike a memory address accessed by a program. For example, the memory address for accessing by the program is converted in the memory 4 into information indicating the actual physical location. The patrol refers to diagnostic access for detecting an error in the memory.

The prioritized patrol control unit 10 controls an operation of prioritized patrol, based on the error information held in the error information holding unit 20. The prioritized patrol may be a patrol operation different from the normal patrol. For example, in the prioritized patrol, when a single bit error has been detected in a read access or a normal patrol, the area is determined based on the detected single bit error information such that diagnostic access is performed.

The prioritized patrol control unit 10 includes an area size setting unit 11, a range determination unit 12, an execution control unit 13, and an error information update unit 14. The size of an area for performing a prioritized patrol (inspection area) is set to the area size setting unit 11. The size of the area for the prioritized patrol may be changed by setting. The range determination unit 12 determines an area for performing the prioritized patrol (inspection area), according to the error information held in the error information holding unit 20 and the size of the area set to the area size setting unit 11.

The execution control unit 13 controls execution of a patrol operation toward the area determined by the range determination unit 12. For example, the execution control unit 13 generates and updates an address for performing diagnostic access and instructs execution of the diagnostic access, based on the area for performing the prioritized patrol as determined by the range determination unit 12. The error information update unit 14 updates the error information stored in the error information holding unit 20, on receiving the execution result of the prioritized patrol from the execution control unit 13.

The access control unit 30 controls access to the memory unit 40. The access control unit 30 controls execution of memory access such as read access and write access to the memory 4 from the processing unit 1 or the like, the prioritized patrol, and the normal patrol, in a specific priority order. The access control unit 30 includes a first multiplexer 31 and a second multiplexer 32.

In cases in which an execution timing signal SPTE of prioritized patrol is activated, the first multiplexer 31 outputs an execution request SPT for the prioritized patrol, and in other cases, the first multiplexer 31 outputs an execution request NPT for the normal patrol. In cases in which an execution timing signal MACE of memory access is activated, the second multiplexer 32 outputs an execution request MAC for the memory access, and in other cases, the second multiplexer 32 outputs an execution request output from the first multiplexer 31. For example, the access control unit 30 causes the memory access to be performed at the timing for executing memory access, and causes the prioritized patrol to be performed when it is not the timing for executing memory access and it is the timing for executing prioritized patrol.

Figure 3:
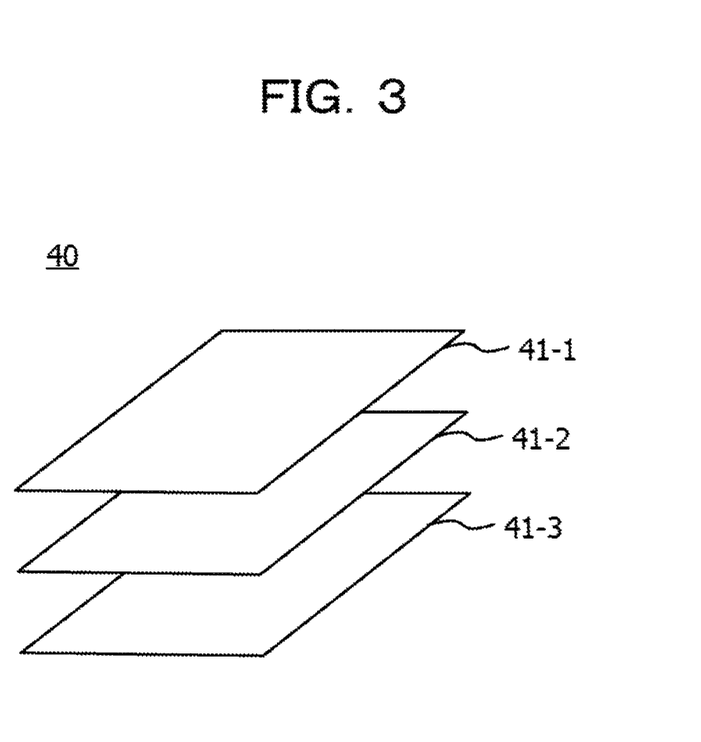
FIG. 3 illustrates an example of implementation of memory chips.

FIG. 3 illustrates an example of implementation of the memory chips. As illustrated in FIG. 3, the memory unit 40 includes plural memory chips 41-1, 41-2, and 41-3 respectively mounted on multiple layers (mounted three-dimensionally). In FIG. 3, memory chips are three-dimensionally mounted such that the memory chip 41-1 is mounted as the first layer, the memory chip 41-2 is mounted as the second layer, and the memory chip 41-3 is mounted as the third layer. Each of the memory chips 41-1 to 41-3 includes plural RAM cells (memory cells).

The RAM cells included in each of the memory chips 41-1 to 41-3 of the memory unit 40 may be, for example, DRAM cells or static random access memory (SRAM) cells, and the embodiment is not limited to such an example. For example, the disclosed technology may be applied to a memory, in which, memory chips that include memory cells in which an error may occur due to an external factor such as bit inversion under the influence of a neutron beam and the like, for example, memory cells and the like that use an electric charge for data storage, are mounted on multiple layers.

The error check and correction unit 50 performs an error inspection for data RDTA read from the memory unit 40, and outputs data RDTB for which error correction processing has been applied as appropriate, as read data. When a single bit error has been detected in an operation of a read access or the normal patrol, the error check and correction unit 50 executes the error correction processing for the data, and sets the error information to the error information holding unit 20.

The error check code generation unit 60 generates an error check code such as ECC, based on the data RDTB or write data MAWDT related to the normal memory access. The error check code generated by the error check code generation unit 60 is added to the data RDTB or the data MAWDT and written into the memory unit 40. The error check code is not limited to the ECC and the like, and an error check code capable of detecting and correcting a single bit error may be applied thereto. For example, each of the functions illustrated in FIG. 2 is integrated in a single semiconductor device, and the patrol for the memory unit is performed by the function units in the semiconductor device.

Figure 4A:
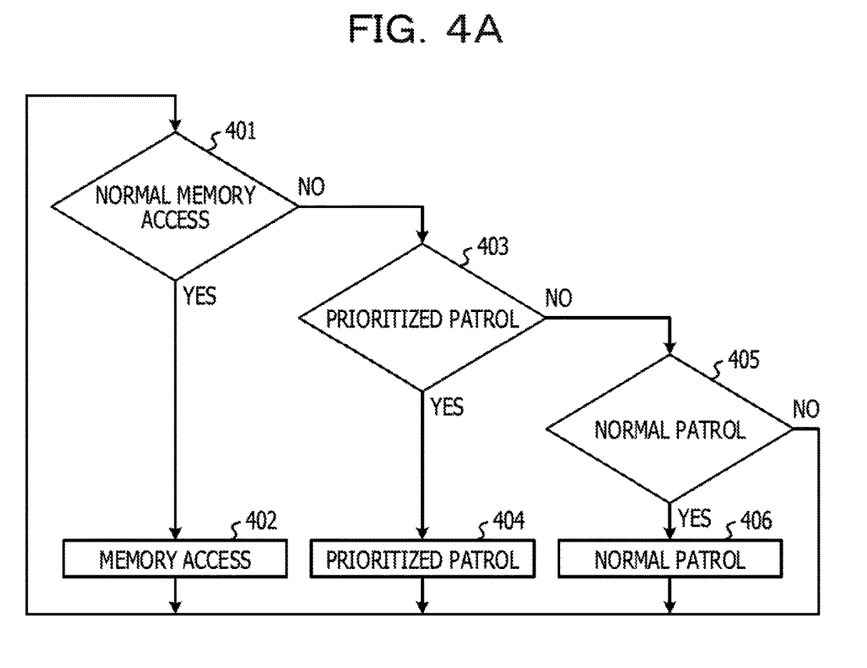
FIGS. 4A and 4B each illustrate an operation of the memory.

FIGS. 4A and 4B each illustrate an example of an operation of the memory. In FIG. 4A, the priority order at the time of memory access is illustrated. For example, whether or not a normal memory access is taking place is determined (401). When a normal memory access is taking place, the normal memory access is executed (402). When a normal memory access is not taking place, whether or not a prioritized patrol is taking place is determined next (403). When a prioritized patrol is taking place, the prioritized patrol is executed (404). When neither a normal memory access nor a prioritized patrol is taking place, whether or not a normal patrol is taking place is determined next (405). When a normal patrol is taking place, the normal patrol is executed (406).

In this manner, in accessing the memory unit 40, a normal memory access is performed with the highest priority, and a prioritized patrol is performed at a timing at which the normal memory access is not taking place. A normal patrol is executed at a timing at which neither the normal memory access nor the prioritized patrol is not taking place.

Figure 4B:
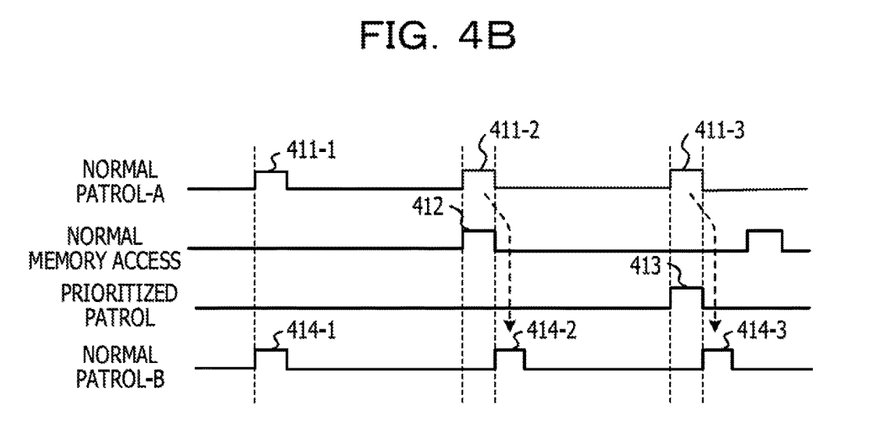

For example, as illustrated in FIG. 4B, at timings 411-1, 411-2, and 411-3 indicated in "normal patrol-A", a normal patrol may be performed when there is no normal memory access or prioritized patrol is taking place. For example, at timing 412 indicated in "normal memory access", a normal memory access takes place, and at timing 413 indicated in "prioritized patrol", a prioritized patrol takes place.

In this case, the normal patrol at the timing 411-2 that overlaps with the timing at which the normal memory access is taking place is performed at the next timing. The normal patrol at the timing 411-3 that overlaps with the timing at which the prioritized patrol is taking place is performed at the next timing. For example, as illustrated in "normal patrol-B", the normal patrol is performed at the timings 414-1, 414-2, and 414-3.

When, for example, a single bit error has been detected in each of the plural memory chips, the prioritized patrol is executed. It is assumed, for example, that the detected single bit error has occurred due to the influence from a neutron beam and the like. The prioritized patrol control unit 10 estimates a traveling direction of the neutron beam and the like from the location at which the single bit error has been detected in each of the memory chips, and determines an inspection area in which to perform the prioritized patrol in a memory chip in other layers.

Figure 5A:
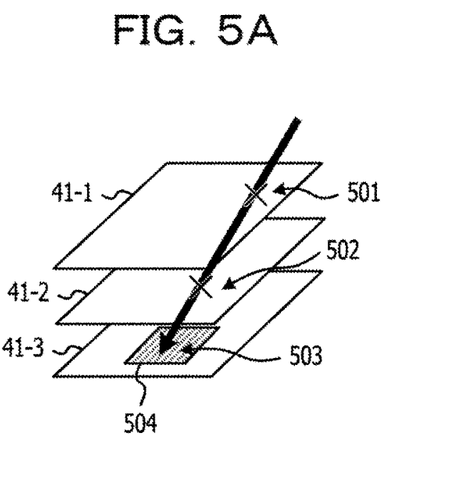
FIGS. 5A and 5B each illustrate an example of prioritized patrol.
Figure 5B:
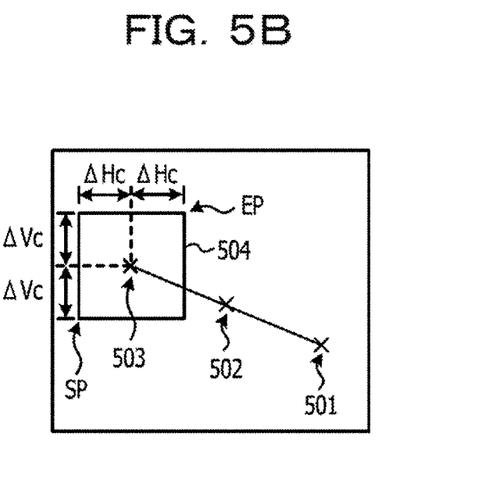

FIGS. 5A and 5B each illustrate an example of the prioritized patrol. In FIG. 5A, the memory chips 41-1 to 41-3 of the memory unit 40 are illustrated three-dimensionally. In FIG. 5B, a state is illustrated in which the memory chips 41-1 to 41-3 of the memory unit 40 are viewed from above superimposed.

For example, as illustrated in FIG. 5A, single bit errors are respectively detected in the memory chip 41-1 of the first layer and the memory chip 41-2 of the second layer. At this time, the prioritized patrol control unit 10 obtains an intersection between a straight line that passes through the respective locations 501 and 502 of the RAM cells of the first layer and the second layer, at each of which the single bit error has occurred, and the memory chip 41-3 of the third layer, based on the error information, and sets the intersection as a central position 503 of an execution area of the prioritized patrol in the third layer.

As illustrated in FIG. 5B, the prioritized patrol control unit 10 determines an area 504 in which the prioritized patrol is to be performed by obtaining a start position (start coordinates) SP and an end position (end coordinates) EP of the prioritized patrol from the central position 503, and an area size ΔHc in the lateral direction and an area size ΔVc in the longitudinal direction. The prioritized patrol control unit 10 performs the prioritized patrol in the determined area 504, and makes the diagnostic access to all of the RAM cells in the area.

Figure 6:
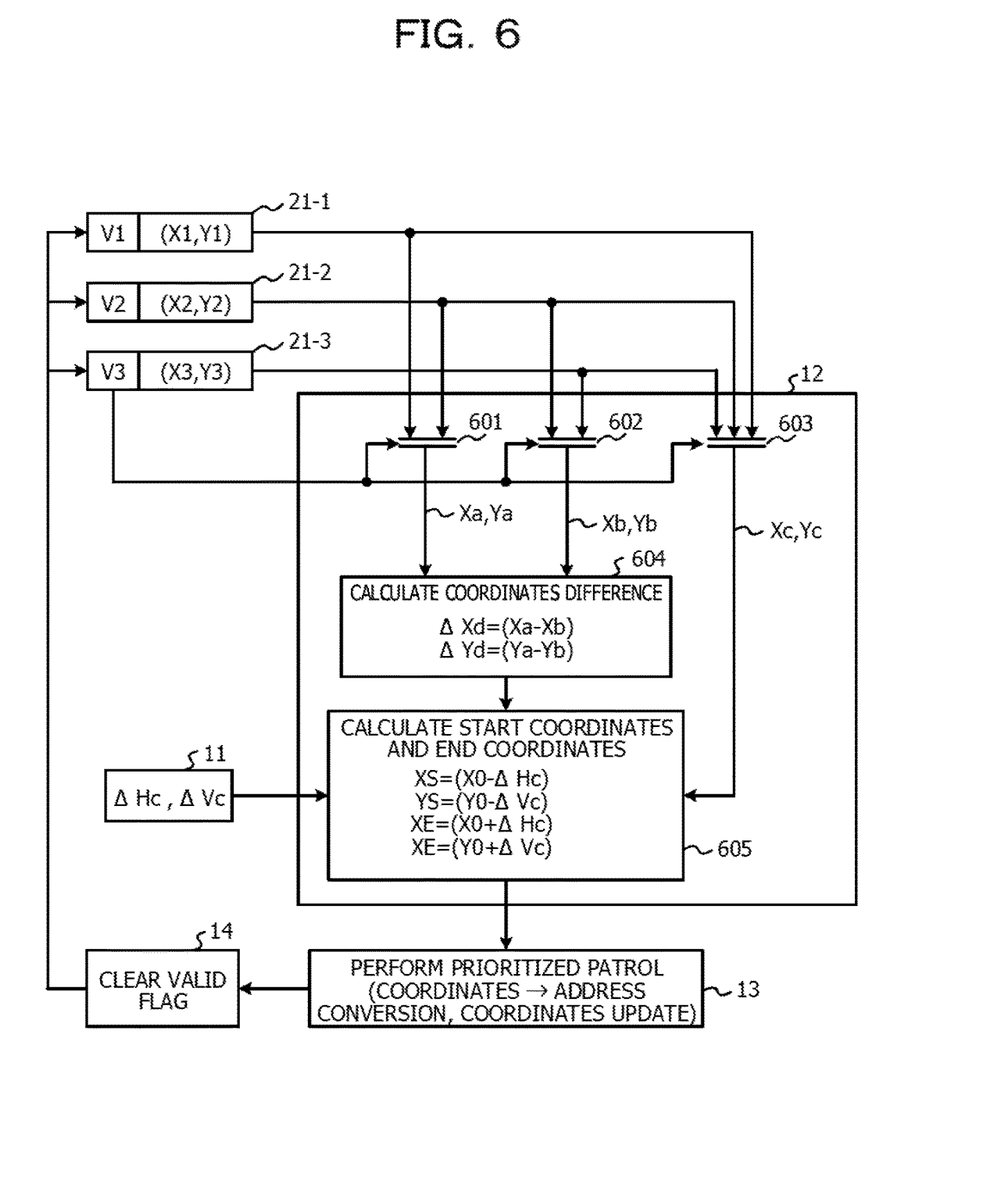
FIG. 6 illustrates an example of a prioritized patrol control unit.

FIG. 6 illustrates an example of the prioritized patrol control. When single bit errors are respectively detected in the plural memory chips included in the memory unit 40, a prioritized patrol on other layers in which no single bit error has been detected is activated. In the range determination unit 12 of the prioritized patrol control unit 10, selection units 601, 602, and 603 respectively output coordinates as location information, based on valid flags V1 to V3 of the error information 21-1 to 21-3.

For example, each of the selection units 601, 602, and 603 selects and outputs the coordinates of the RAM cell in which the single bit error has been detected, according to the set valid flag. Coordinates (Xa,Ya) output by the selection unit 601 and coordinates (Xb,Yb) output by the selection unit 602 are used to calculate a difference between the coordinates of the RAM cells in each of which the single bit error has been detected (difference between the location 501 and the location 502 in FIG. 5). Coordinates (Xc,Yc) output by the selection unit 603 are used to calculate the central position 503 of the area in which the prioritized patrol is to be performed.

Thus, for example, when single bit errors have been respectively detected in the first layer and the second layer, and for example, when the valid flags V1 and V2 are set, the selection unit 601 outputs coordinates (X1, Y1) in the error information 21-1 as the coordinates (Xa,Ya), and the selection unit 602 outputs coordinates (X2, Y2) in the error information 21-2 as the coordinates (Xb,Yb). The selection unit 603 outputs either one of the coordinates (X1, Y1) in the error information 21-1 and the coordinates (X2, Y2) in the error information 21-2 as the coordinates (Xc,Yc).

For example, when single bit errors have been respectively detected in the first layer and the third layer, and for example, when the valid flags V1 and V3 are set, the selection unit 601 outputs the coordinates (X1, Y1) in the error information 21-1 as the coordinates (Xa,Ya), and the selection unit 602 outputs coordinates (X3, Y3) in the error information 21-3 as the coordinates (Xb,Yb). The selection unit 603 outputs either one of the coordinates (X1, Y1) in the error information 21-1 and the coordinates (X3, Y3) in the error information 21-3 as the coordinates (Xc,Yc).

For example, when single bit errors have been respectively detected in the second layer and the third layer, and for example, when the valid flags V2 and V3 are set, the selection unit 601 outputs the coordinates (X2, Y2) in the error information 21-2 as the coordinates (Xa,Ya), and the selection unit 602 outputs the coordinates (X3, Y3) in the error information 21-3 as the coordinates (Xb,Yb). The selection unit 603 outputs either one of the coordinates (X1, Y1) in the error information 21-1 and the coordinates (X3, Y3) in the error information 21-3 as the coordinates (Xc, Yc).

In the range determination unit 12, a calculation unit 604 calculates a difference value ΔXd of the X coordinates (=Xa−Xb) and a difference value ΔYd of the Y (=Ya−Yb) coordinates, from the coordinates (Xa,Ya) that have been output from the selection unit 601 and the coordinates (Xb,Yb) that have been output from the selection unit 602. In the range determination unit 12, a calculation unit 605 determines an area in which the prioritized patrol is to be performed, from the difference values ΔXd and ΔYd that have been calculated in the calculation unit 604, the coordinates (Xc,Yc) that have been output from the selection unit 603, and the area sizes ΔHc and ΔVc that have been set to the area size setting unit 11.

The calculation unit 605 calculates the coordinates (X0, Y0) of the central position 503 of the area in which the prioritized patrol is to be performed, from the difference values ΔXd and ΔYd that have been calculated in the calculation unit 604 and the coordinates (Xc,Yc) that have been output from the selection unit 603. When mounting distances between the chips in the memory unit 40 are substantially equal, the coordinates (X0,Y0) is calculated by adding or subtracting the difference values ΔXd and ΔYd (or integral multiples of the values) with respect to the coordinates (Xc,Yc).

For example, when single bit errors are respectively detected in the first layer and the second layer, and the coordinates (X1, Y1) in the error information 21-1 are output as the coordinates (Xc,Yc), the coordinates (X0,Y0) are obtained from "X0=Xc+2ΔXd" and "Y0=Yc+2ΔYd". For example, when single bit errors are respectively detected in the first layer and the second layer, and the coordinates (X2, Y2) in the error information 21-2 are output as the coordinates (Xc,Yc), the coordinates (X0,Y0) are obtained from "X0=Xc+ΔXd" and "Y0=Yc+ΔYd". When the mounting distances between the chips in the memory unit 40 are not equal, the difference values ΔXd and ΔYd may be corrected as appropriate according to a difference between distances.

The calculation unit 605 calculates the start coordinates (XS,YS) indicating the start position SP and the end coordinates (XE,YE) indicating the end position EP respectively of the area in which the prioritized patrol is to be performed, from the calculated coordinate (X0,Y0) and the area sizes ΔHc and ΔVc that have been set to the area size setting unit 11. The start coordinates (XS,YS) are obtained from "XS=X0−ΔHc" and "YS=Y0−ΔVc", and the end coordinates (XE,YE) are obtained from "XE=X0+ΔHc" and "YE=Y0+ΔVc". The calculation unit 605 determines the area in which the prioritized patrol is to be performed, in this manner.

When the area in which the prioritized patrol is to be performed is determined by the range determination unit 12, the execution control unit 13 performs the prioritized patrol in accordance with the start coordinates (XS,YS) and the end coordinates (XE,YE) that have been calculated in the range determination unit 12. The execution control unit 13, while sequentially updating the coordinates from the start coordinates (XS,YS) to the end coordinates (XE,YE), converts the coordinates into addresses and makes diagnostic access to all of the RAM cells in the area. In such diagnostic access, when a single bit error has been detected, the error correction processing is applied by the error check and correction unit 50, and the obtained data is written back to the memory unit 40.

When the prioritized patrol reaches the end coordinates (XE,YE), and the diagnostic access is completed for all of the RAM cells in the area, the execution control unit 13 notifies the error information update unit 14 of the completion of the prioritized patrol. The error information update unit 14 that has received the notification clears the valid flags set to the error information 21-1 to 21-3. The prioritized patrol is completed in the manner as described above.

For example, when single bit errors have been respectively detected in the plural memory chips, an area in which a single bit error may occur in a memory chip of other layer is estimated based on the locations in which the single bit errors have been detected, and the patrol is performed with a higher priority than the normal patrol. Therefore, when single bit errors are detected, a single bit error in a memory chip of other layer may be detected at an early timing, and may improve the reliability of memory.

Figure 7A:
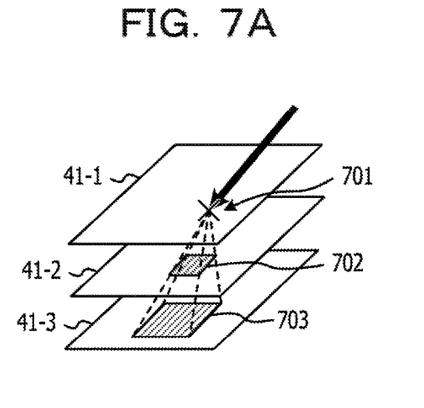
FIGS. 7A and 7B each illustrate an example of prioritized patrol.
Figure 7B:
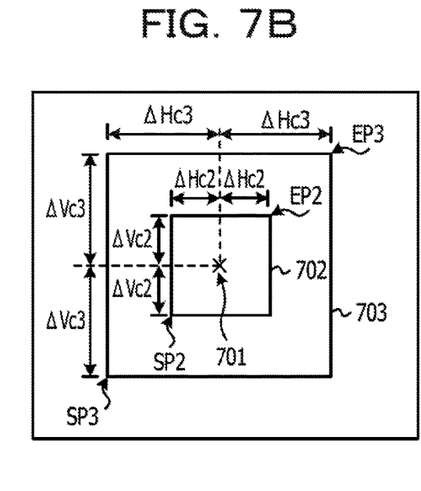

FIGS. 7A and 7B each illustrate an example of the prioritized patrol. The prioritized patrol illustrated in FIGS. 7A and 7B may be performed in the configurations of the information processing device and the memory illustrated in FIG. 1 or 2. In the following description, description regarding similar points may be omitted.

When a single bit error has been detected in one of the plural memory chips, the prioritized patrol is performed. Using the location at which the single bit error has been detected as a central position, the prioritized patrol on the memory chips of other layers is performed such that an area for which the prioritized patrol is performed is expanded as the distance (spacing) becomes longer from the memory chip in which the single bit error has been detected. For example, the more distant is the memory chip of other layer from the memory chip in which the single bit error has been detected, the wider becomes the area in which the prioritized patrol is to be performed in the memory chip of such other layer.

In FIG. 7A, the memory chips 41-1 to 41-3 of the memory unit 40 are illustrated three-dimensionally. In FIG. 7B, a state is illustrated in which the memory chips 41-1 to 41-3 of the memory unit 40 are viewed from above superimposed.

For example, as illustrated in FIG. 7A, a single bit error is detected in the memory chip 41-1 of the first layer. At this time, the prioritized patrol control unit 10 sets a location 701 of the RAM cell of the first layer, in which the single bit error has occurred, as the central position used when the prioritized patrol is performed in the other layers, based on the error information. As illustrated in FIG. 7B, the prioritized patrol control unit 10 determines an area 702 in which the prioritized patrol is to be performed by obtaining a start position (start coordinates) SP2 and an end position (end coordinates) EP2, respectively, of the prioritized patrol in the second layer, from the central position 701, and a set area size ΔHc2 in the lateral direction and a set area size ΔVc2 in the longitudinal direction.

The prioritized patrol control unit 10 determines an area 703 in which the prioritized patrol is to be performed by obtaining a start position (start coordinates) SP3 and an end position (end coordinates) EP3, respectively, of the prioritized patrol in the third layer, from the central position 701, and a set area size ΔHc3 in the lateral direction and a set area size ΔVc3 in the longitudinal direction. Because the area 703 is further away from the memory chip in which the single bit error has been detected, the sizes of the area sizes ΔHc3 and ΔVc3 are set larger than the area sizes ΔHc2 and ΔVc2. The area sizes ΔHc2 and ΔVc2 and the area sizes ΔHc3 and ΔVc3 may be changed according to setting.

Figure 8:
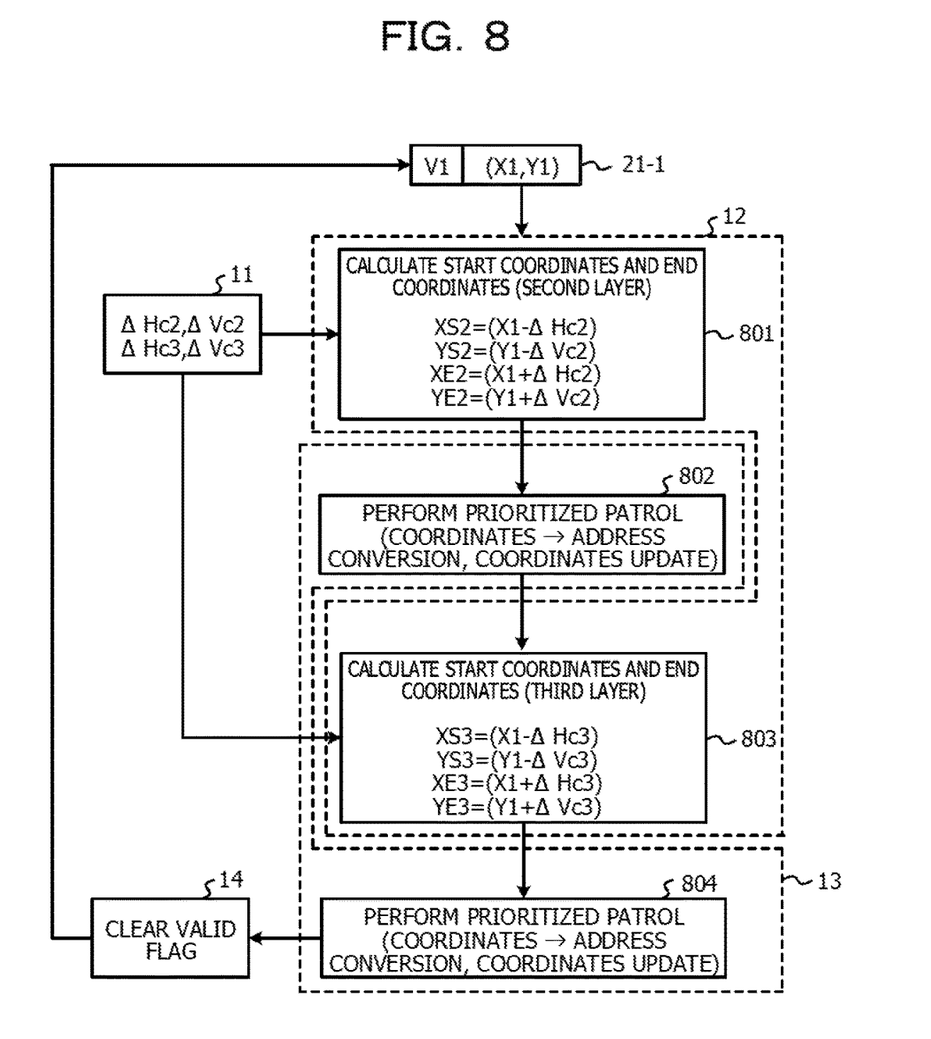
FIG. 8 illustrates an example of the prioritized patrol control unit.

FIG. 8 illustrates an example of the prioritized patrol control unit 10. For example, when a single bit error has been detected in the memory chip of the first layer, the prioritized patrol may be performed on the memory chips of the second layer and the third layer. When a single bit error has been detected in the memory chip of the second layer, the prioritized patrol may be performed by determining inspection areas having similar sizes in the memory chips of the first layer and the third layer. When a single bit error has been detected in the memory chip of the third layer, the prioritized patrol may be performed by determining inspection areas in the memory chips of the first layer and the second layer such that the inspection area of the first layer is caused to be made larger than the second layer.

When a single bit error has been detected in the memory chip of the first layer, the valid flag V1 is set to the error information 21-1, and the coordinates (X1,Y1) indicating the location of the RAM cell, at which the error has been detected, is stored in the error information 21-1. The setting of the valid flag V1 of the error information 21-1 causes start-up of the prioritized patrol for the layers other than the first layer. In the range determination unit 12, a calculation unit 801 determines an area in which the prioritized patrol is to be performed in the second layer, from the coordinates (X1,Y1) in the error information 21-1 and the area sizes ΔHc2 and ΔVc2 set to the area size setting unit 11.

The calculation unit 801 calculates the start coordinates (XS2,YS2) indicating the start position SP2 and the end coordinates (XE2,YE2) indicating the end position EP2, respectively, of the area in which the prioritized patrol is to be performed in the second layer, based on the coordinates (X1,Y1) and the set area sizes ΔHc2 and ΔVc2. The start coordinates (XS2,YS2) is obtained from "XS2=X1−ΔHc2" and "YS2=Y1−ΔVc2", and the end coordinates (XE2,YE2) is obtained from "XE2=X1+ΔHc2" and "YE2=Y1+ΔVc2".

When the area in which the prioritized patrol is to be performed is determined by the range determination unit 12, in the execution control unit 13, an execution unit 802 performs the prioritized patrol in the second layer in accordance with the start coordinates (XS2,YS2) and the end coordinates (XE2,YE2) that have been calculated by the range determination unit 12. The execution unit 802, while sequentially updating the coordinates from the start coordinates (XS2,YS2) to the end coordinates (XE2,YE2), converts the coordinates into addresses, and makes diagnostic access to all of the RAM cells in the area. In such diagnostic access, when a single bit error has been detected, the error correction processing is applied by the error check and correction unit 50, and the obtained data is written back to the memory unit 40.

When the prioritized patrol reaches the end coordinates (XE2,YE2), and the prioritized patrol in the second layer is completed, in the range determination unit 12, a calculation unit 803 determines an area in which the prioritized patrol is to be performed in the third layer from the coordinates (X1,Y1) in the error information 21-1 and the area sizes $\Delta Hc3$ and $\Delta Vc3$ set to the area size setting unit 11.

The calculation unit 803 calculates start coordinates (XS3,YS3) indicating the start position SP3 and the end coordinates (XE3,YE3) indicating the end position EP3, respectively, of the area in which the prioritized patrol is to be performed in the third layer, based on the coordinates (X1,Y1) and the set area sizes $\Delta Hc3$ and $\Delta Vc3$. The start coordinates (XS3,YS3) are obtained from "XS3=X1−$\Delta Hc3$" and "YS3=Y1−$\Delta Vc3$", and the end coordinates (XE3,YE3) are obtained from "XE3=X1+$\Delta Hc3$" and "YE3=Y1+$\Delta Vc3$".

When the area in which the prioritized patrol is to be performed is determined by the range determination unit 12, in the execution control unit 13, an execution unit 804 performs the prioritized patrol in the third layer in accordance with the start coordinates (XS3,YS3) and the end coordinates (XE3,YE3) that have been calculated by the range determination unit 12. The execution unit 804, while sequentially updating the coordinates from the start coordinates (XS3,YS3) to the end coordinates (XE3,YE3), converts the coordinates into addresses, and makes diagnostic access to all of the RAM cells in the area. In such diagnostic access, when a single bit error has been detected, the error correction processing is applied by the error check and correction unit 50, and the obtained data is written back to the memory unit 40.

When the prioritized patrol reaches the end coordinates (XE3,YE3) and the prioritized patrol in the third layer is completed, thereby completing the prioritized patrol for all of the layers, the execution control unit 13 notifies the error information update unit 14 of the completion of the prioritized patrol. The error information update unit 14 that has received the notification clears the valid flag V1 set to the error information 21-1. The prioritized patrol is completed in the manner as described above.

For example, the prioritized patrol in the third layer may be performed after the prioritized patrol in the second layer has been performed, and the execution order of the prioritized patrol may be arbitrary. It is sufficient that the prioritized patrol based on the detected single bit error is performed in memory chips of all of the layers other than the memory chip of a layer in which a single bit error has been detected.

In FIGS. 7A, 7B, and 8, when a single bit error has been detected in one of the plural memory chips, patrol areas in the memory chips of the other layers are determined based on the location, and the patrol is performed with a higher priority than the normal patrol. Therefore, when single bit errors are detected, a single bit error in a memory chip of other layer may be detected at an early timing, and may improve the reliability of memory.

Figure 9:
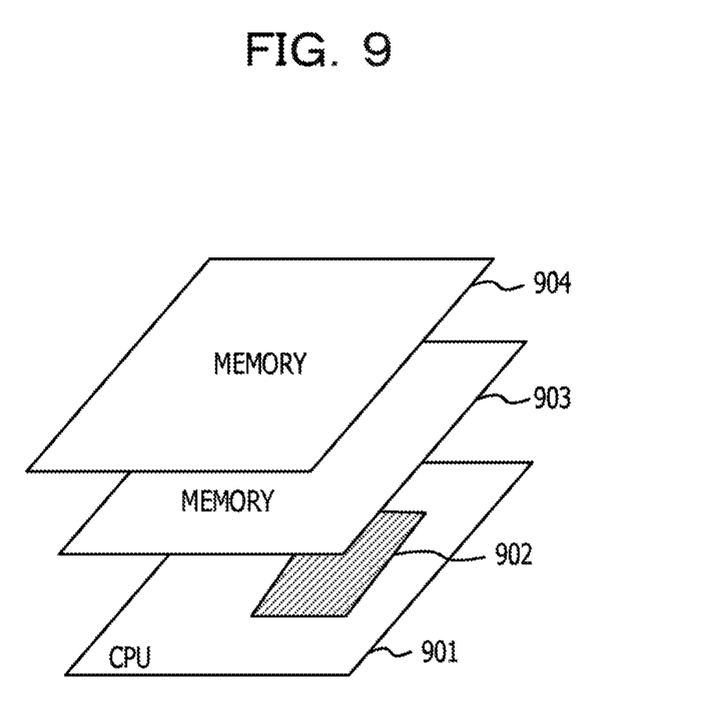
FIG. 9 illustrates an example of implementation of a CPU chip and memory chips.

The example in which the plural memory chips are respectively mounted in the multiple layers is described above, however the embodiment is not limited thereto. FIG. 9 illustrates an example of implementation of a CPU chip and memory chips. For example, as illustrated in FIG. 9, the above-described technology may be similarly applied to a case in which a CPU chip 901 and memory chips 903 and 904 are mounted in multiple layers, and a cache memory 902 that holds data between a core part and the memory chips 903 and 904 as a RAM macro is disposed inside the CPU chip 901. What is mentioned above may be applicable not only to the cache memory, but also to a case in which a chip in which a local memory, a register buffer, and the like are disposed as a RAM macro and memory chips are mounted three-dimensionally.

For example, the function related to the prioritized patrol illustrated in FIGS. 5A and 5B and the function related to the prioritized patrol illustrated in FIGS. 7A and 7B may be provided in a single semiconductor device (memory). In this case, whether to perform the prioritized patrol illustrated in FIGS. 5A and 5B or the prioritized patrol illustrated in FIGS. 7A and 7B may be switched according to a mode setting and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a processor that executes processing of data; and
a memory module that includes a first memory in which a plurality of memory chips each which stores the data are mounted in layers, and a memory controller that controls the first memory, the memory controller:
inspects the data;
executes correction processing of the data when a single bit error is detected;
determines, when a single bit error is detected in a memory chip which is included in the plurality of memory chips and is mounted in a first layer of the layers, a first inspection area provided in another memory chip which is included in the plurality of memory chips and is mounted in another layer of the layers, based on a first location at which the single bit error occurs; and
executes first inspection of data in the first inspection area.

2. The information processing device according to claim 1, wherein the memory controller determines a second inspection area in the another memory chip of the another layer, based on the first location and a second location at which a single bit error occurs in a second memory chip which is included in the plurality of memory chips and is mounted in a second layer which is included in the layers and is different from the first layer when a single bit error is detected in the second memory chip.

3. The information processing device according to claim 2, wherein the memory controller determines the second inspection area using a point on a straight line coupling the first position and the second position as a center point.

4. The information processing device according to claim 1, wherein the memory controller:
determines the first inspection area using the first position as a center point, and expands the first inspection area as the another layer becomes further apart from the first layer.

5. The information processing device according to claim 1, wherein the memory module includes a second memory that holds error information including information on the first position, and the memory controller determines the first inspection area using the error information held in the second memory.

6. The information processing device according to claim 5, wherein the error information includes information indicating whether or not the single bit error is detected, and the memory controller updates the error information into a state in which the single bit error is not detected when execution of the first inspection of the data in the first inspection area is completed.

7. The information processing device according to claim 1, wherein a size of the first inspection area is settable arbitrarily.

8. The information processing device according to claim 1, wherein the memory controller performs the first inspection of the data for the first inspection area, with a higher priority than a second inspection executed for the data of the first memory within a specific time period.

9. A semiconductor device comprising:
a first memory in which a plurality of memory chips each which stores data are mounted in layers; and
a memory controller that controls the first memory, the memory controller:
inspects the data;
executes correction processing of the data when a single bit error is detected;
determines, when a single bit error is detected in a memory chip which is included in the plurality of memory chips and is mounted in a first layer of the layers, a first inspection area provided in another memory chip which is included in the plurality of memory chips and is mounted in another layer of the layers, based on a first location at which the single bit error occurs; and
executes first inspection of data in the first inspection area.

10. The semiconductor device according to claim 9, wherein the memory controller determines a second inspection area in the another memory chip of the another layer, based on the first location and a second location at which a single bit error occurs in a second memory chip which is included in the plurality of memory chips and is mounted in a second layer which is included in the layers and is different from the first layer when a single bit error is detected in the second memory chip.

11. The semiconductor device according to claim 10, wherein the memory controller determines the second inspection area using a point on a straight line coupling the first position and the second position as a center point.

12. The semiconductor device according to claim 9, wherein the memory controller: determines the first inspection area using the first position as a center point, and expands the first inspection area as the another layer becomes further apart from the first layer.

13. The semiconductor device according to claim 9, further comprising;
a second memory that holds error information including information on the first position, wherein the memory controller determines the first inspection area using the error information held in the second memory.

14. The semiconductor device according to claim 13, wherein the error information includes information indicating whether or not the single bit error is detected, and the memory controller updates the error information into a state in which the single bit error is not detected when execution of the first inspection of the data in the first inspection area is completed.

15. The semiconductor device according to claim 9, wherein a size of the first inspection area is settable arbitrarily.

16. The semiconductor device according to claim 9, wherein the memory controller performs the first inspection of the data for the first inspection area, with a higher priority than a second inspection executed for the data of the first memory within a specific time period.

17. A memory inspection method, comprising:
inspecting, by a memory controller, data stored in a first memory in which a plurality of memory chips each which stores data are mounted in layers;
executing correction processing of the data when a single bit error is detected;
determining, when a single bit error is detected in a memory chip which is included in the plurality of memory chips and is mounted in a first layer of the layers, a first inspection area provided in another memory chip which is included in the plurality of memory chips and is mounted in another layer of the layers, based on a first location at which the single bit error occurs; and
executing first inspection of data in the first inspection area.

18. The memory inspection method according to claim 17, further comprising:
determining a second inspection area in the another memory chip of the another layer, based on the first location and a second location at which a single bit error occurs in a second memory chip which is included in the plurality of memory chips and is mounted in a second layer which is included in the layers and is different from the first layer when a single bit error is detected in the second memory chip.

19. The memory inspection method according to claim 17, wherein the second inspection area is determined using a point on a straight line coupling the first position and the second position as a center point.

20. The memory inspection method according to claim 17, wherein the first inspection area is determined using the first position as a center point, and the first inspection area is expanded as the another layer becomes further apart from the first layer.

* * * * *